United States Patent

[11] 3,562,478

[72] Inventors Moreland P. Bennett;
   Giuliano V. Giusti, Pittsfield, Mass.
[21] Appl. No 471,669
[22] Filed July 13, 1965
[45] Patented Feb. 9, 1971
[73] Assignee General Electric Company
   a corporation of New York

[54] RESISTANCE WELDING APPARATUS FOR PRODUCING SUBSTANTIALLY CREVICE-FREE WELDS
1 Claim, 5 Drawing Figs.

[52] U.S. Cl. .................................................. 219/82,
   219/83, 219/117
[51] Int. Cl. .................................................... B23k 11/06
[50] Field of Search .......................................... 219/83, 84, 117, 82

[56] References Cited
UNITED STATES PATENTS
| | | | |
|---|---|---|---|
| 1,742,336 | 1/1930 | Agnew | 219/83 |
| 2,560,678 | 7/1957 | Wirt | 219/117 |

OTHER REFERENCES
Welding Handbook (3rd Ed.) pp. 365, 372, 373 Pub. 1950 by Am. Welding Soc., 33 W. 39th St. New York, N.Y. TS 227 A5h '50(Copy in Gr.213)

*Primary Examiner*—R. F. Staubly
*Attorneys*—Gilbert P. Tarleton, Francis X. Doyle, Melvin A. Goldenberg, Frank L. Neuhauser and Oscar B. Waddell ABSTRACT: A resistance welding technique for welding two overlapped sheet metal members to obtain a substantially crevice-free weld. A pair of resistance welding electrodes, with at least one of the resistance electrodes having a beveled face, are applied to opposite sides of the overlapped sheet metal members with the beveled electrode extending beyond the edge of one of the overlapped sheet metal members. Welding force and current are applied to the electrodes with such current and force being first concentrated, by the beveled electrode, on the edge of one of the sheet metal members. The welding force applied to the welding electrodes is substantially twice the force applied in normal resistance welding while the applied current is substantially the same as that used in normal resistance welding.

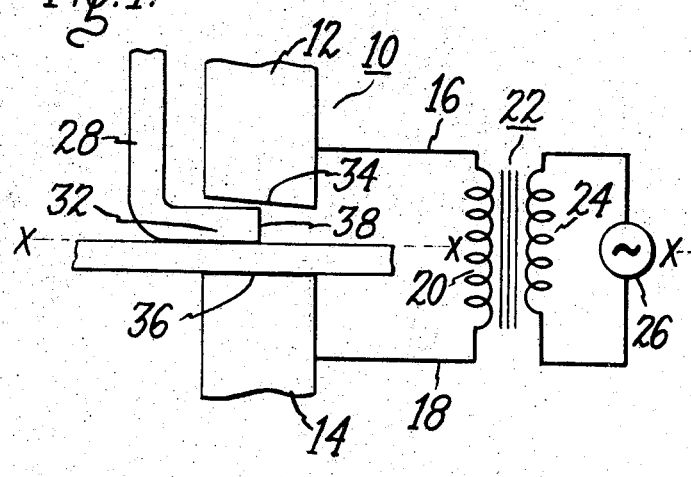
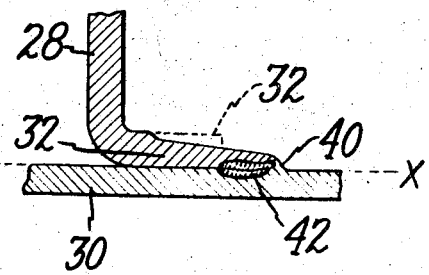
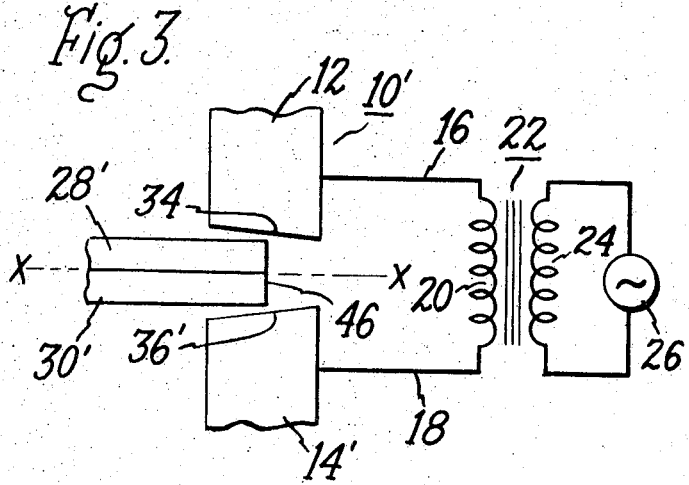
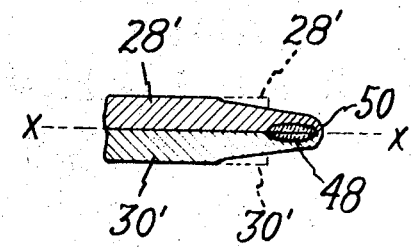

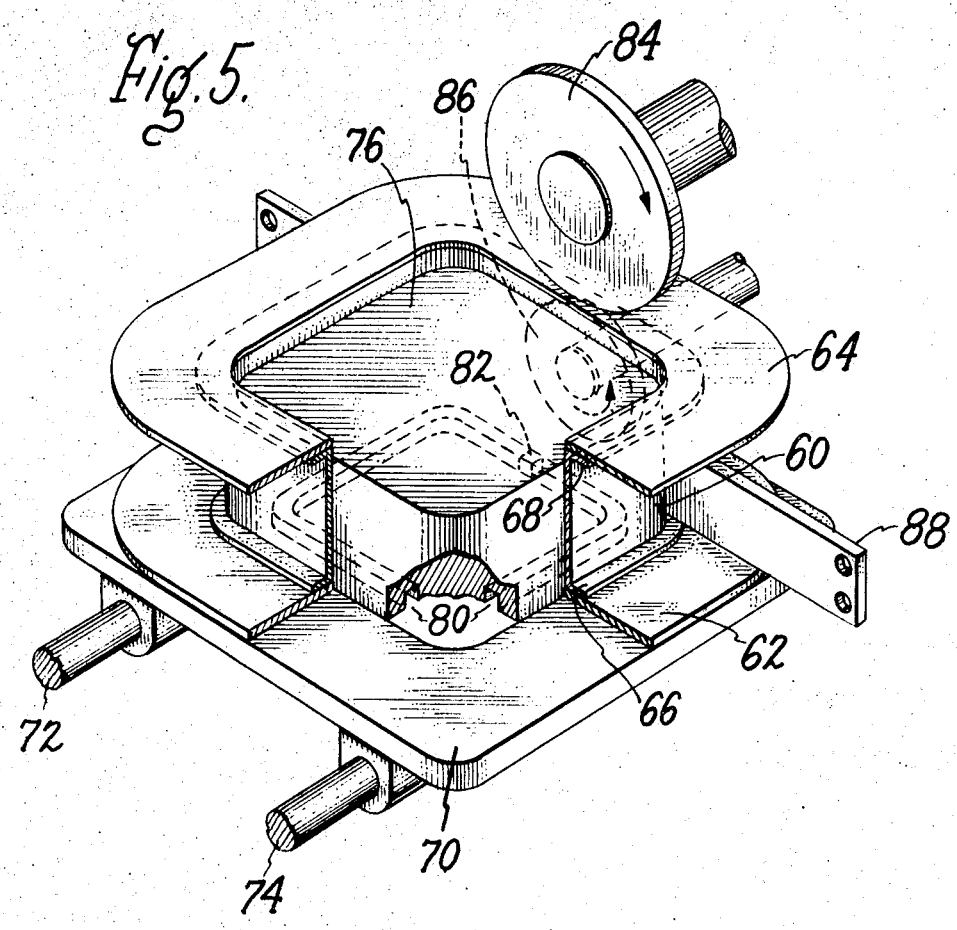

RESISTANCE WELDING APPARATUS FOR PRODUCING SUBSTANTIALLY CREVICE-FREE WELDS

This invention relates to welding and more particularly to apparatus and a method for performing resistance welding to produce crevice-free welds.

In present day welding practice, resistant lap welds require substantial flange and edge distances to insure sufficient metal adjacent the weld area to retain the weld nugget formed during the welding operation. If insufficient metal surrounds the weld area, there is excessive expulsion of the molten material, deformation of the weld, and the weld nugget is improperly formed. In such welds, where the weld nugget is improperly formed or there is deformation of the weld, the welds are very porous and extremely low in strength. In making crevice-free edge welds normally a fusion weld is used, sometimes in conjunction with spotwelding, since resistance welding of edges is considered poor practice due to insufficient metal being available to surround the weld area.

In making sealed containers it is necessary to provide welded seams that are free of crevices. An example of a sealed container is the sealed transformer described and claimed in application Ser. No. 387,125 filed Aug. 3, 1964 for Hermetically Sealed Transformer in the names of Roger F. Schrader et al. and assigned to the same assignee as this application. In such containers it is also desirable to provide weld surface that can be readily painted and which will not be subjected to corrosion. Obviously, it is necessary that the welded seams leak be leaktight and free of sharp surfaces. The lapped welded seams using resistance lapwelding in present day practice are considered unsuitable because of the crevices formed by the overlapped edges of the welded pieces. For some products fusion welding for edges is also considered unsatisfactory due to the lack of necessary strength in the edge welding and due to high probability of voids, and surface irregularities which are present in the edge weld.

It is, therefore, one object of this invention to provide a lap or edge weld free of crevices.

A further object of this invention is to provide a method of lap and edge welding by the use of resistance welding wherein one edge of a welding member flows into the flange of another welding member.

A still further object of this invention is to provide a resistance weld which is leaktight and free of sharp edges.

A still further object of this invention is to provide an apparatus for resistance welding two metal members without edge overlap.

In carrying out this invention in one form, a crevice-free weld is made between two overlapped metal members. A pair of opposed welding electrodes are provided, at least one electrode having an angled or beveled face with respect to the joint plane of the metal members. The beveled electrode overlaps the edge of one on the metal members. The Welding current and force are applied to the electrode, the current and force being concentrated by the beveled electrode substantially at the edge of one metal member to provide a crevice-free weld. Where the members are to be seamed welded, the electrodes are in the form of rotatable wheels with the periphery of at least one wheel beveled or angled with respect to the joint plane of the metal members. The beveled wheel overlaps the edge of one of the metal members, the wheels are driven to cause relative movement between the overlapped metal members and the wheels to provide a seam weld between the metal members along the edge of the one metal member.

The invention which is sought to be protected will be particularly pointed out and distinctly claimed in the claims appended hereto. However, it is believed that this invention and the manner in which it various objects and advantages are obtained, as well as other objects and advantages thereof, will be better understood from the following detailed description of preferred embodiments thereof particularly when considered in the light of the accompanying drawing, in which:

FIG. 1 is a schematic showing of one form of a resistance welding machine which may be used in practicing this invention;

FIG. 2 is a sectional view of a lap weld made by the machine of FIG. 1;

FIG. 3 shows a welding machine and electrodes which may be used in making an edge weld according to this invention;

FIG. 4 is a sectional view of an edge weld made by use of the electrodes of FIG. 3 in accordance with this invention; and FIG. 5 is a perspective view of a preferred form of apparatus for welding end members to a casing member.

Reference will now be made to the drawing in which like numerals are used to indicate like parts throughout the various views thereof. Considering first FIG. 1, there is shown schematically one form of resistance welding apparatus 10 which may be used in the practice of this invention. The resistance welding apparatus 10 comprises a pair of welding electrodes 12 and 14 electrically connected by lines 16 and 18 to opposite sides of the secondary 20 of a welding transformer 22. The primary 24 of transformer 22 is connected to a source 26 of electrical energy. A pair of metal members 28 and 30 are shown, which are to be welded together by the apparatus 10. As shown, member 28 has a flange portion 32 to be welded to the face of member 30 in a lap weld along the joint plane X-X of the members 28 and 30. As can be seen from FIG. 1, the face 34 of electrode 12 is angled or beveled with respect to the joint plane X-X of the members 28 and 30 to be welded. In the showing of FIG. 1, the face 36 of electrode 14 is flat, engaging the member 30. Also, as is shown, the beveled face 34 overlaps the edge 38 of the flange 32. As will be apparent from FIG. 1, when electrode 12 is moved downward into contact with flange 32 of member 28, the face 34 will contact only the edge portion 38 of flange 32 due to the overlap and to the bevel or angle of face 34. Thus the welding force and current will be concentrated at the edge 38 of flange 32 effectively forcing the edge 38 into the lower member 30. As welding current and force continue, the flange 32 will follow the bevel of face 34 thus distributing the force and current over a larger portion of flange 32. The concentrated force and current tend to upset the member 30 below edge 38 and this upset forms a fillet, as at 40 in FIG. 2, sealing the edge of the flange 32.

Referring now to FIG. 2 of the drawing, there is shown a section through a lap weld made by the apparatus 10. As can be seen in FIG. 2, a weld nugget 42 is formed in the joint plane X-X as the metal members 28 and 30 flow together during formation of the weld. Clearly shown is fillet 40 caused by the metal flow in the lower member 30. The phantom lines in FIG. 2 show the original shape of the flange 32. As can be seen, flange 32 has assumed the bevel shape of face 34 of electrode 12. As is apparent the metal members 28 and 30 flow together substantially along the joint plane X-X forming a crevice-free, leaktight weld.

In practicing this invention the welding force applied between the electrodes 12 and 14 is substantially twice the force applied for normal resistance welding. The welding current is substantially the same. In welding 60 to 70 mil sheet stock and using an electrode of approximately 5/16-inch width, a welding force of approximately 1,000 pounds is used, in normal resistance welding techniques. In making welds in accordance with this invention, such as the weld shown in FIG. 2, and using a similar width beveled electrode, a welding force of approximately 2,400 pounds is applied between the electrodes. As will be understood, the force applied by the beveled electrode to the edge of the flange substantially exceeds the 2 to 1 ratio when first applied due to the concentration of the welding force along the edge of the flange. As the welding operation continues and the flange assumes the shape of the beveled electrode, the welding force is applied uniformly to the flange under the beveled electrode. Thus the welding force applied in pounds per square inch at the completion of the weld is substantially lower than when first applied, approximately the 2 to 1 ratio of the applied force.

Referring now to FIG. 3 of the drawing, a welding apparatus is shown for making a crevice-free edge weld between two metal members. The apparatus 10' is similar to apparatus 10 of FIG. 1, it includes a pair of electrodes 12 and 14' which are connected by lines 16 and 18 to the secondary 20 of the welding transformer 22. The primary 24 of transformer 22 is connected to a source of electrical energy 16. Electrode 12 of apparatus 10' is beveled at 34 with respect to the joint plane X-X in the same manner as in FIG. 1. The electrode 14' is also beveled or angled at 36' with respect to plane X-X as is indicated. Members 28' and 30' meet at joint plane X-X with their edges 44, 46 substantially aligned. The beveled or angled faces 34' and 36' each overlap the edges 44, 46 of members 28' and 30'. Thus when welding current and force are applied to electrodes 12' and 14' the current and force will be concentrated along the edges 44, 46 causing the members to flow along the joint plane X-X. As current and force continue the members 28' and 30' will assume the beveled shape of the electrode faces as is shown in FIG. 4.

FIG. 4 shows the edge weld that results when using the apparatus of FIG. 3. The phantom lines show the original shape of the members 28' and 30', while the full lines show the beveled edges that result from the welding operation. The weld nugget 48 is formed along the joint plane X-X as the metal for members 28' and 30' flow together during the weld. A rounded shaped nose or fillet 50 is formed in the front of weld nugget 48, as shown, sealing the edge of the weld. This fillet is similar to that formed during the lap weld of FIGS. 1 and 2 and clearly appears in the macrophotographs of the edge weld. Of course, it will be understood that where a seam weld is desired the electrodes 12 and 14' could be welding wheels wherein relative movement between the wheels and the welding members would form a seam weld between the weld members.

FIG. 5 shows one form of apparatus for forming a seam weld between end members and a central casing. Referring now to FIG. 5, there is shown in perspective view a central casing 60 to which is to be welded the end members 62, 64. As can be seen from FIG. 5, the casing 60 has flanges 66 and 68 which are to be welded respectively to end members 62 and 64. The welding apparatus is provided with a base plate 70 movable on rods 72, 74. A centering plug 76 is provided which snugly fits within the casing 60. Plug 76 is movably mounted on base plate 70 and is provided with an internal cam surface 80 on the bottom thereof. A cam follower 82 is provided in base plate 70 as shown. A pair of resistance welding wheels 84, 86 are provided which are driven in the direction shown by the arrow. As will be understood the periphery of lower wheel 86 is beveled or angled with respect to the joint plane between flange 68 and end member 64. A guide bar 88 is provided to aid in keeping the path of the weld parallel to the rotating plane of the resistance wheels 84 and 86. As will be understood the cam follower 82 is preferably on the same center line as the axis of the resistance wheels 84, 86. The center line of the cam follower is spaced from the edge of the plug a distance equal to the corner radius of the weld.

In operation of the apparatus of FIG. 5, the base plate 70 is moved on rods 72, 74 away from rotating wheels 84, 86. A plug 76 of the same size as the inside of the casing 60 is placed on base plate 70 and cam follower 82 fits within the cam surface 80 of the plug 76. The casing 60 is then placed over the plug 76 and end member 64 is placed on top of casing 60 as is shown. The base plate is then pushed forward on rods 72, 74 into welding position with respect to resistance wheels 84, 86 and the base plate is locked in position. Preferably the end member 64 is spotwelded at one or two locations to the flange 68 to hold it in position during the welding operation. The resistance wheels 84, 86 are then closed over the flange 68 and the end member 64 applying welding current and force to the members in the manner explained with reference to FIGS. 1 and 3. The wheels 84, 86 are then driven and cause movement of the flange 64 and casing 60 by movement of the plug 76 along the base plate 70 as the cam 80 moves along cam follower 82. The guide bar 88 maintains the weld parallel to the plane of rotation of wheels 84, 86. As the corner of the casing 60 is reached, cam 80 moves about the cam follower 82, around the corner, bringing the other side of casing 60 in contact with wheels 84, 86. Of course, the plug 76 and the casing 60 together with end member 64 rotate about the cam follower in the corner thus forming the weld around the corner with the desired radius of weld. The plug 76 is then free to proceed along the straight section of the cam 80 along the guide bar 88 thus welding the second side of the flange 68 and end member 64. As will be apparent, this process is repeated until the entire seam weld is provided between the flange 68 and end members 64. When the weld is completed base plate 70 is removed from weld wheels 84, 86. The casing is turned over end for end, replaced on the plug 76, the second end member 62 placed on top thereof engageable with the flange 66 and the welding process repeated. From this it will be apparent that by means of the apparatus of this invention a seam weld may be provided between two members by use of a resistance weld without crevices or voids, providing a leaktight, crevice-free weld which is free of sharp edges. Obviously since the edge of one member flows into the other member in the manner shown particularly in FIG. 2, a crevice-free weld is provided which is free of voids and which is readily paintable and not subject to corrosion.

While there has been shown and described the present preferred embodiments of this invention many changes will occur to those skilled in the art. Obviously, other ways could be used to mount the plug member on a base plate to obtain the desired seam welding between the flanges of the casing and the end members thereof. These and other changes which will be obvious to those skilled in the art are considered to be within the spirit and scope of the invention, particularly as it is defined by the appended claims.

I claim:

1. Apparatus for making a substantially crevice-free seam weld between a casing member and an end member comprising:
   a. a base plate having a cam follower thereon;
   b. a center plug contoured to snugly fit within the casing member and having a cam therein, said plug fitting on said base plate with said cam overlying said cam follower;
   c. a pair of resistance electrodes in the form of rotatable wheels, at least one of said wheels having a periphery beveled with respect to the joint plane of the case member and the end member, means for applying force and current to the case member and end member through said resistance electrodes; and
   d. and means for driving said wheels to move said casing member and said end member through said wheels along the path of said cam to seamweld said casing and said end member together.

PO-1050
(5/69)

UNITED STATES PATENT OFFICE
CERTIFICATE OF CORRECTION

Patent No. 3,562,478　　　　　　　　　Dated February 9, 1971

Inventor(s) Moreland P. Bennett and Giuliano V. Giusti

It is certified that error appears in the above-identified patent and that said Letters Patent are hereby corrected as shown below:

Column 1, line 29 - Delete "leak"

Column 2, line 61 - "1000" should be - 1200 -

Column 3, line 7 - "16" should be - 26 -

Column 3, line 29 - Delete "the" - first occurrence -

Column 4, line 59 - Delete "and"

Signed and sealed this 20th day of July 1971.

(SEAL)
Attest:

EDWARD M. FLETCHER, JR.　　　　　　　WILLIAM E. SCHUYLER, JR.
Attesting Officer　　　　　　　　　　Commissioner of Patents